US010336293B2

(12) United States Patent
Bazant et al.

(10) Patent No.: US 10,336,293 B2
(45) Date of Patent: Jul. 2, 2019

(54) MOTOR VEHICLE COMPRISING IMPROVED DEFLECTION MEMBER OF A SAFETY BELT DEVICE AND METHOD

(71) Applicant: Ford Global Technologies, LLC, Dearborn, MI (US)

(72) Inventors: Carsten Bazant, Cologne (DE); Gregor Frosch, Cologne (DE); Joerg Frank Doering, Neuss (DE); Martin Kizil, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 108 days.

(21) Appl. No.: 15/633,900

(22) Filed: Jun. 27, 2017

(65) Prior Publication Data
US 2018/0001866 A1    Jan. 4, 2018

(30) Foreign Application Priority Data
Jul. 1, 2016    (DE) .................. 10 2016 212 010

(51) Int. Cl.
*B60R 22/195* (2006.01)
*B60R 22/24* (2006.01)
*B60R 22/18* (2006.01)
*B60R 22/10* (2006.01)

(52) U.S. Cl.
CPC .......... *B60R 22/195* (2013.01); *B60R 22/105* (2013.01); *B60R 22/24* (2013.01); *B60R 2022/1818* (2013.01)

(58) Field of Classification Search
CPC .......... B60R 2022/1818; B60R 22/195; B60R 22/24; B60R 22/19
See application file for complete search history.

(56) References Cited

U.S. PATENT DOCUMENTS

| 4,730,875 A | * | 3/1988 | Yoshitsugu | ............. B60R 22/02 297/468 |
| 5,609,367 A | | 3/1997 | Eusebi et al. | |
| 6,276,721 B1 | | 8/2001 | Romeo | |

(Continued)

FOREIGN PATENT DOCUMENTS

| DE | 4423142 A1 * | 1/1996 | .......... B60R 22/023 |
| DE | 10160293 A1 | 7/2002 | |

(Continued)

*Primary Examiner* — Ruth Ilan
(74) *Attorney, Agent, or Firm* — Vichit Chea; Price Heneveld LLP

(57) ABSTRACT

A motor vehicle comprises a three-point safety belt device to a motor vehicle seat, wherein the safety belt device comprises a belt, a belt magazine, a belt buckle for releasably securing the belt and a deflection member. The deflection member is provided for guiding the belt emerging from the belt magazine and for deflecting the belt and forming a belt portion of the belt, wherein the belt portion is guided over a shoulder and a chest of a secured motor vehicle occupant seated on the motor vehicle seat. The deflection member is designed such that in the state of the motor vehicle occupant secured by the belt, when the belt portion is subjected to an increased tensile loading, the belt portion performs a displacement from a comfort position into an emergency position in the direction of the motor vehicle interior.

19 Claims, 1 Drawing Sheet

(56) References Cited

U.S. PATENT DOCUMENTS

| | | | | |
|---|---|---|---|---|
| 7,137,648 | B2 * | 11/2006 | Schulz | B60R 22/28 |
| | | | | 280/805 |
| 7,520,532 | B2 | 4/2009 | Bell et al. | |
| 7,802,819 | B2 * | 9/2010 | Ng | B60R 22/18 |
| | | | | 280/808 |
| 8,408,599 | B2 | 4/2013 | Strnad et al. | |
| 8,479,863 | B2 * | 7/2013 | Adolfsson | B60R 22/18 |
| | | | | 180/268 |
| 9,623,836 | B2 | 4/2017 | Kujawa et al. | |
| 9,725,067 | B2 * | 8/2017 | Shenaq | B60N 2/688 |
| 2006/0289220 | A1 * | 12/2006 | Oota | B60R 21/02 |
| | | | | 180/274 |
| 2011/0133540 | A1 * | 6/2011 | Kato | B60N 2/688 |
| | | | | 297/463.1 |
| 2015/0266448 | A1 * | 9/2015 | Aoki | B60R 22/20 |
| | | | | 297/313 |
| 2015/0367813 | A1 * | 12/2015 | Ballarin | B60N 2/50 |
| | | | | 280/805 |
| 2016/0121846 | A1 * | 5/2016 | Kujawa | B60R 22/195 |
| | | | | 280/801.1 |
| 2016/0257284 | A1 * | 9/2016 | Farooq | B60R 22/28 |

FOREIGN PATENT DOCUMENTS

| | | | |
|---|---|---|---|
| DE | 102015117729 A1 | 5/2016 | |
| EP | 0374893 A2 * | 6/1990 | B60N 2/688 |
| FR | 2916392 B1 * | 7/2009 | B60N 2/12 |
| JP | 2012081913 A | 4/2012 | |
| JP | 2015054560 A | 3/2015 | |

* cited by examiner

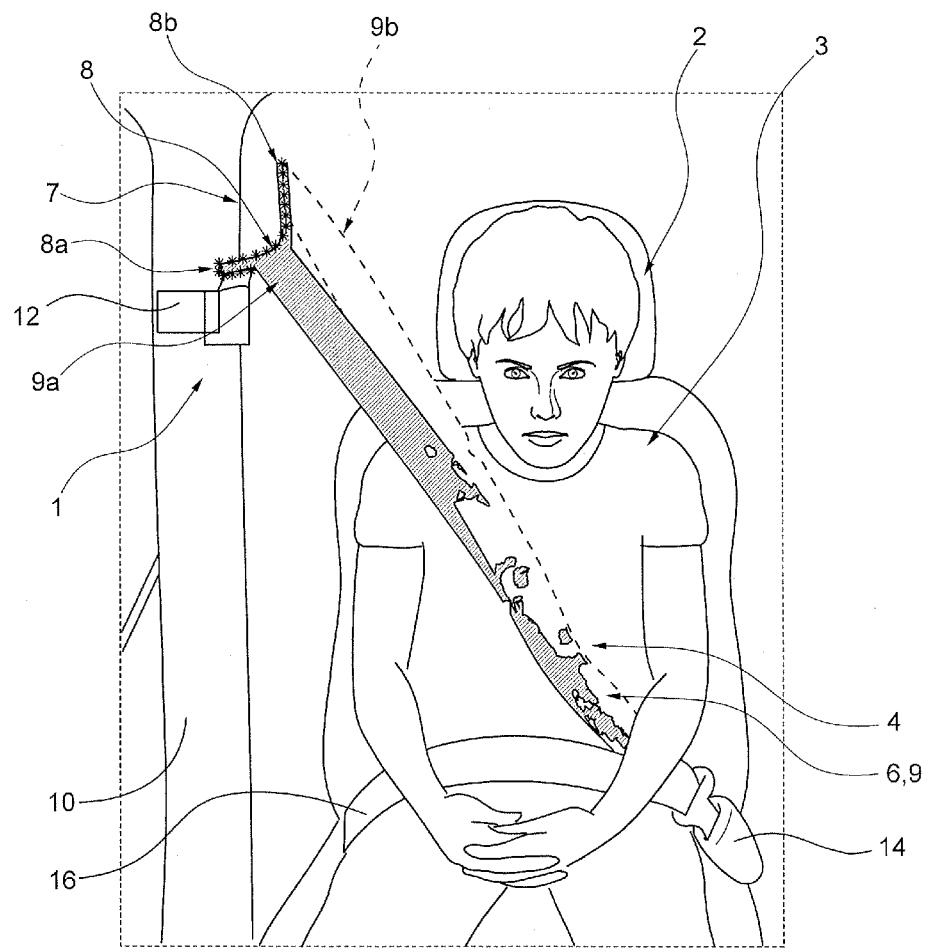

MOTOR VEHICLE COMPRISING IMPROVED DEFLECTION MEMBER OF A SAFETY BELT DEVICE AND METHOD

FIELD OF THE INVENTION

The present invention generally relates to motor vehicle seat belts, and more particularly to a multipoint safety belt device for motor vehicle seats and a method for adapting the belt path.

BACKGROUND OF THE INVENTION

Three-point safety belt devices are commonly employed on motor vehicle seats and serve for securing a motor vehicle occupant seated on the associated motor vehicle seat and, in particular, for the retention of the motor vehicle occupant in the case of a motor vehicle collision or sudden deceleration. Safety belts for the occupants of motor vehicles are nowadays regulated by law in almost all countries. These safety belts are supplied in mass production from most motor vehicle manufacturers as basic equipment of the motor vehicle.

In the construction of the different belt types (i.e., multipoint belts, such as for example two-point belts, three-point belts) hitherto a great deal of value was placed on the fastening of the belts and on the buckles for locking the belt after the securing procedure, as well as the tightening of the belt in the event of an imminent collision.

Self-retracting belts, i.e., seat belts which are rolled up into a belt magazine or tensioner driven in a spiral spring store and which when applied are pulled out of this belt magazine counter to the spring action of the spiral spring store, form part of the prior art. The belts permit a certain degree of mobility to the occupant who uses the safety belt since, although the belt bears against the body, it permits a movement of the secured person on the seat in a resiliently flexible manner.

In the event of sudden acceleration of the secured person, for example with sudden braking or an impact of the motor vehicle, the resilient flexibility of the belt is prevented by a device operating by the acceleration forces present, and the person is therefore protected from slipping out or striking the motor vehicle and/or the consequences of an impact are substantially reduced.

The type of seat belts set forth above, in particular so-called three-point belts which secure the secured person by two belt portions over the torso and pelvis, belong to the most popular and most used safety belt devices. In these three-point belts, the belt portion leading over the shoulder and torso of the secured occupant is guided out of the magazine along the bodywork of the motor vehicle via a deflection member which, in the secured position of the belt, permits the belt portion to pass diagonally over the torso of the relevant occupant.

The purpose of the deflection member is to ensure the low-friction guidance of the belt in order to ensure a correct reaction of the belt mechanism, i.e., to guarantee a blocking of the belt moving out of the belt magazine at the moment of sudden acceleration and in order to permit the belt to pass easily through the deflection member of the preferred three-point safety belt device with the greatest possible freedom of movement of the secured occupant. Moreover, the deflection member defines the uppermost position of the belt, wherein an adaptation of this position of the belt, for example, might be expedient at least in the case of a motor vehicle collision or shortly before a motor vehicle collision, or in the case of sudden acceleration (deceleration). Such a displacement is desired in order to prevent the belt portion from slipping off the shoulder but, in particular, in the case where the original position of the belt is not optimally adapted to the body size of the secured person because, for example, a height adjustment for the deflection member is not provided or the height adjustment which is present is not able to be set sufficiently low.

JP 2012-081913 discloses a motor vehicle comprising a three-point safety belt device which is assigned to a seat in the motor vehicle rear and which has a deflection member for a belt with a through-opening, wherein the through-opening defines two deflection edges for the deflection of the belt, the deflection edges being located at an angle to one another.

DE 101 60 293 B4 discloses a three-point safety belt device for a rear seat in which the belt is parked in a holder in the unused state.

U.S. Pat. No. 8,408,599 discloses a motor vehicle comprising a three-point safety belt device with a deflection member which is fastened to a B-pillar. The deflection member has a through-opening which defines two positions of the belt which are offset to one another in the longitudinal direction of the motor vehicle.

U.S. Pat. No. 6,276,721 discloses a motor vehicle with a three-point safety belt device which comprises a multipart belt system consisting of a lap belt and a belt for the torso and the shoulder. Instead of a deflection member a pivot arm fastening is provided of the belt guided over the torso and the shoulder.

U.S. Pat. Nos. 7,520,532 and 5,609,367 disclose a motor vehicle with a three-point safety belt device and an additional deflection member with a carabiner opening in order to be able to thread the belt portion, which is provided for crossing over the torso, through the additional deflection member and to achieve an adaptation of the belt path, if required. Such an additional deflection member disadvantageously increases the friction of the belt guidance within the meaning of the above descriptions.

It would be desirable to provide a motor vehicle comprising at least one multipoint safety belt device, preferably a three-point safety belt device, which is improved both with regard to comfort and also with regard to safety, and having a simple construction. Additionally, it would be desirable to specify an improved method for adapting the belt path.

SUMMARY OF THE INVENTION

According to one embodiment, a motor vehicle is provided. The motor vehicle includes a vehicle seat, and a multipoint safety belt device. The multi safety belt device includes a belt, a belt magazine, a belt buckle for releasably securing the belt, and a deflection member for guiding the belt emerging from the belt magazine and for deflecting the belt, forming a belt portion of the belt, wherein the belt portion is guided over a shoulder and a chest of a secured motor vehicle occupant seated on the motor vehicle seat, and wherein the deflection member is designed such that, in the state of the motor vehicle occupant secured by the belt, the belt portion when subjected to an increased tensile loading performs a displacement from a comfort position of the belt into an emergency position of the belt in the direction of a motor vehicle interior.

According to another aspect of the invention, a motor vehicle is provided. The motor vehicle includes a vehicle seat, and a multipoint safety belt device. The multipoint safety belt device includes a belt, a belt magazine, a belt buckle for releasably securing the belt, and a deflection member for guiding and deflecting the belt emerging from the belt magazine and forming a shoulder belt portion that when subjected to an increased tensile loading is displaced from a comfort position into an emergency position in a direction of a vehicle interior.

According to a further aspect of the invention, a method for adapting a belt path in a motor vehicle. The method includes the steps of providing a motor vehicle comprising at least one multipoint safety belt device for a motor vehicle seat, wherein the safety belt device comprises a belt, a belt magazine, a belt buckle for releasably securing the belt and a deflection member, and guiding and deflecting the belt emerging from the belt magazine and forming a belt portion of the belt guided over a shoulder and a chest of a secured motor vehicle occupant seated on the motor vehicle seat. The method also includes the step of displacing the belt portion with the deflection member when the belt portion is subjected to an increased tensile loading, from a comfort position into an emergency position in the direction of a motor vehicle interior.

These and other aspects, objects, and features of the present invention will be understood and appreciated by those skilled in the art upon studying the following specification, claims, and appended drawings.

BRIEF DESCRIPTION OF THE DRAWING

In the drawing:

The FIGURE is a schematic partial view of a motor vehicle having a multipoint safety belt device restraining an occupant on a seat, according to one embodiment.

DETAILED DESCRIPTION OF THE PREFERRED EMBODIMENTS

A motor vehicle 1, according to one embodiment, is shown only partially in the view of the FIGURE by showing a part of the bodywork, in this case the C-pillar 10 and a seat 2. In the rear region of the passenger compartment, the motor vehicle 1 has the vehicle seat 2 which may be a component of a rear seat bench. On the vehicle seat 2 is located a seated occupant 3 who is intended to be restrained in the event of a collision or a sudden acceleration, i.e., a sudden deceleration of the motor vehicle 1, by a multipoint safety belt device, preferably a three-point safety belt device 4. The multipoint safety belt device is hereinafter denoted as a three-point safety belt device, wherein naturally other multipoint safety belt devices are also intended to be encompassed thereby.

The three-point safety belt device 4 has a belt 6 which may be in the form of a belt webbing. Due to a deflection member 7 which is attached, for example, to the C-pillar 10 of the motor vehicle 1, the belt 6 extends from a belt tensioner or belt magazine 12 along the bodywork 1 to the aforementioned deflection member 7, passes through a through-passage 8 configured therein in order to be then deflected in the secured state and in order to define a belt portion 9 which extends from the deflection member 7 over the shoulder and over the torso of the occupant 3, at the same time crossing diagonally over the torso, in the direction and as far as a belt buckle 14 located on the pelvis of the occupant 3. Here the belt 6 is deflected again, crosses over a pelvic region of the occupant 3 in order to form a lap belt portion 16 and is secured with its end to the bodywork 1 of the motor vehicle 1.

As illustrated in the FIGURE, the deflection member 7 comprises a sickle-shaped narrow through-passage 8. In the applied state, the through-passage 8 defines a contour which is formed from two portions and which is provided to bear against the belt portion 9. The contour, i.e., the two portions of the through-passage 8, together have an extent which preferably corresponds to more than double the width B of the belt 6, whereby a continuous displacement of the belt 6 in the through-passage 8 is permitted. A park position of the belt, when the belt is not applied, is not shown in the FIGURE.

The through-passage 8 comprises the portion 8a which extends substantially horizontally outwardly and is oriented in the direction of a vehicle front. The portion 8b has a substantially vertical path and extends inwardly in the direction of a vehicle rear.

The through-passage 8 and/or the contour thereof is configured such that the belt portion 9 in the applied state, on the one hand, adopts an external path relative to the geometric motor vehicle center, as indicated by the reference numeral 9a, and in the applied state, on the other hand, adopts an internal path relative to the geometric motor vehicle center, as indicated by the reference numeral 9b. By the reference numeral 9a, a comfort position of the belt 6, i.e., of the belt portion 9, may also be denoted, wherein by the reference numeral 9b, an emergency position of the belt 6, i.e., of the belt portion 9, may be denoted. A park position of the belt in the unapplied state is not shown in the FIGURE.

Due to the alignment of the path of the through-passage 8 with its portions 8a and 8b, which is inclined relative to the longitudinal axis of the motor vehicle 1, the path of the belt portion 9 denoted by the reference numeral 9b is characterized in that it is arranged offset to the rear, inwardly and upwardly relative to the path of the belt portion 9 denoted by the reference numeral 9a. This displacement of the belt portion 9 from the portion 8a into the portion 8b is exclusively effected by an increase in a tensile loading of the belt portion 9.

While in the path 9a the tensile loading is only determined by the pretensioning of the spring store belt magazine 12 and is denoted as the comfort position of the belt portion 9 due to the arrangement in the portion 8a. The positional alteration of the belt portion 9 into the portion 8b, i.e., into the emergency position 9b, is caused by a collision of the motor vehicle 1, the sudden deceleration thereof and/or the tensile loading affected by the triggering of a belt tensioner in the belt magazine 12.

In the emergency position 9b of the belt 6, the risk of the belt portion 9 slipping off the shoulder of the occupant 3 is reduced, while the position of the belt portion 9 reached in the comfort position 9a is perceived as more comfortable by the occupant 3. This belt path in comfort position 9a is effectively the permanent position in the applied state, while the belt path in emergency position 9b is only set in an emergency situation. The belt path in the park position, not shown, might be arranged in the portion 8a in the external position, according to one embodiment.

By means of the disclosed safety belt device and method, it is advantageously achieved that in the applied state the belt portion 9 has an optimal comfort position 9a, wherein in an emergency situation the belt portion 9 is transferred into an optimal emergency position 9b, i.e., relative to the comfort position 9a as it is preferably displaced further inward and optionally further to the rear and upwardly, as visible in the FIGURE. In particular, with smaller occupants 3, such as for example children, or small adults, in an emergency situation the relevant belt portion 9 has an ideal path over the shoulder of the occupant 3. It is also advantageous that the belt 6 remains in an externally arranged position, i.e., in the park position, not shown, when the relevant vehicle seat is not occupied by an occupant. This is an advantage which appears to be surprising when the position of the rear seat bench is altered, since the belt is held in a non-interfering position.

The aforementioned belt tensioner is provided, for example, between the belt buckle 5 and the bodywork 1 or between the belt magazine 12 and the bodywork 1. The belt magazine may serve as the belt tensioner.

It should be mentioned that the features and measures set forth individually in the following description may be combined together in any technically expedient manner and disclose further embodiments of the vehicle, the safety belt device and method of adapting the belt path. The description characterizes and specifies the disclosed features, in particular, additionally in connection with the FIGURE.

The disclosure relates to a motor vehicle which comprises at least one multipoint safety belt device, preferably a three-point safety belt device, which is assigned to a motor vehicle seat of the motor vehicle. Herein, the multipoint safety belt device is denoted as a three-point safety belt device which is not intended to be limiting. In one embodiment, the three-point safety belt devices are the three-point safety belt devices of the outer seats in the rear of a passenger compartment of a motor vehicle. Naturally, it may also be the three-point safety belt device on the front seats. The three-point safety belt device according to one embodiment comprises a belt, a belt magazine having a belt tensioner, a belt buckle for releasably securing the belt and a deflection member. The deflection member is provided for guiding and deflecting the belt which emerges from the magazine and which is guided along the bodywork of the motor vehicle and also for guiding a belt portion belonging to the belt emerging from the deflection member further over a shoulder and a chest of a secured motor vehicle occupant seated on the motor vehicle seat. If booster seats and/or child seats or the like are arranged on the motor vehicle seat, the aforementioned also applies.

The deflection member is fastened, for example, to a C-pillar. The deflection member is fastened, for example, pivotably and/or displaceably to the bodywork of the motor vehicle, i.e., by way of example to the C-pillar. In front seats, the deflection member is fastened accordingly to the B-pillar. Preferably, the deflection member is rigidly fastened to the bodywork of the motor vehicle, i.e., by way of example to the C-pillar or B-pillar. Preferably, the belt is configured in one piece and in the secured state defines a lap belt portion and the aforementioned belt portion which is guided over the shoulder and the torso of an occupant. Preferably, the belt portion is guided over the torso, passing diagonally obliquely from top to bottom and extends, for example, over the left shoulder to the right side of the pelvis or over the right shoulder to the left side of the pelvis. Preferably, the other end of the belt portion guided over the shoulder and the torso is defined by the portion of the belt between the belt buckle and the deflection member.

According to one embodiment, the deflection member is designed such that the belt portion, which is guided over the shoulder and the torso of an occupant in the state of the motor vehicle occupant secured by means of the belt, is displaced, when the belt portion is subjected to an increased tensile loading in the applied state, from a comfort position of the belt into an emergency position of the belt in the direction of the motor vehicle interior, for example in a direction parallel to the transverse axis of the motor vehicle. For example, the increase in tensile loading results from an additional loading of the belt portion due to a collision of the motor vehicle or the abrupt deceleration thereof. Preferably, the increase in the tensile loading of the belt portion results from the triggering of a belt tensioner. Naturally, the deflection member also has a park position for the belt when the belt is not applied.

According to one embodiment, it is provided that the displacement of the belt portion in the direction of the motor vehicle interior is effected by the deflection member. This is understood as bringing the belt portion which passes over the torso and the shoulder of the occupant closer toward the geometric center of the motor vehicle. This displacement of the belt portion into the emergency position under collision load and/or in the event of an imminent collision load or in the case of sudden acceleration (deceleration) ensures that the risk of the belt portion slipping off a shoulder of the occupant is reduced and thus the effective restraint of the occupant, in particular the torso thereof, is not at risk. In particular, by means of the displacement into the emergency position, it is possible to compensate for a path of the belt portion which is not optimal due to a body size which deviates significantly from the expected average of the motor vehicle occupant, an incorrectly adjusted height of an adjustable deflection member and a body position of the occupant which deviates from the expected seat position, for example a sleeping position.

It has been shown that, by an inward displacement of the belt portion into the emergency position, it is possible to prevent in an effective manner the belt portion from slipping off the shoulder, while an external position (comfort position) relative to the geometric motor vehicle center, which is adopted in the case of low tensile loading, is perceived as more comfortable for the motor vehicle occupant.

Moreover, the external position, i.e., the park position, is advantageous when it is a case of stowing the retracted and unused belt. For example, therefore, the folding back of a rear bench of a motor vehicle is simplified.

According to one embodiment of the motor vehicle, it is provided that, in the state of the motor vehicle occupant secured by means of the belt, the belt portion which is guided over the shoulder and the torso performs a displacement in the direction of the motor vehicle rear and thus counter to the forward direction of travel, when the belt portion is subjected to the increased tensile loading. Preferably, this rearwardly oriented displacement takes place at the same time as the inward displacement of the belt portion.

It is further provided that the displacement of the belt portion is effected automatically and only by the belt portion being subjected to the increased tensile loading. As a result, additional actuators are dispensed with.

Preferably, it is provided that the deflection member comprises a through-passage, which the belt passes through and which has a contour comprising two portions, the contour comprising the park position, the comfort position and the emergency position for applying the belt portion guided over the shoulder and the torso, wherein when the belt portion is subjected to the increased tensile loading the belt portion is displaced along these portions. As a result, a structurally simple displacement of the belt portion is achieved. As already mentioned, the through-passage has in one of its portions a further external position, i.e., the park position for the unapplied state of the belt.

For example, the contour is of sickle-shaped configuration and, for example, has two linear portions enclosing an angle, for example, of 90° to 120°. The two portions have the three positions, i.e., the park position, the comfort position and the emergency position. Naturally, the aforementioned angular range is intended to be interpreted as merely by way of example and non-limiting, wherein angular deviations, i.e., for example about 130° or more or less, are also conceivable. Preferably, the contour has an extent which exceeds the width of the belt and preferably exceeds twice the width of the belt. Preferably, the extent is a maximum of three times the width of the belt. The extent of the belt perpendicular to the unwinding direction is understood as the width.

According to a further variant, the deflection member is designed such that in the secured state, the belt portion performs an upward displacement when the belt portion is subjected to the increased tensile loading. Preferably, this upwardly oriented displacement takes place at the same time as the inward displacement of the belt portion and optionally at the same time as the rearwardly oriented displacement of the belt portion. In this regard, the belt portion in the emergency position is preferably displaced both upwardly and also rearwardly and inwardly. Naturally, it is also within the meaning of the disclosure to displace the belt portion only upwardly, rearwardly or inwardly into the emergency position, wherein naturally combinations of two displacement directions are also conceivable.

Preferably, the increased tensile loading is at least partially affected by a belt tensioner. For example, the belt tensioner is a spring-operated or pyrotechnically-fired belt tensioner. The belt tensioner is designed, for example, to be reversible.

The disclosure further relates to a method for adapting the belt path, comprising the steps: in a provisioning step a motor vehicle is provided with at least one multipoint safety belt device, preferably a three-point safety belt device, which is assigned to a motor vehicle seat, in particular in the motor vehicle rear of the motor vehicle, wherein the preferred three-point safety belt device comprises a belt, a belt magazine, a belt buckle for releasably securing the belt and a deflection member, wherein the deflection member is provided for guiding the belt emerging from the belt magazine along the bodywork of the motor vehicle and for deflecting the belt, forming a belt portion of the belt, wherein the belt portion is guided over a shoulder and a chest of a secured motor vehicle occupant seated on the motor vehicle seat.

According to one embodiment, moreover, a displacement step is subsequently provided, in which in the secured state a displacement of the belt portion is effected, when the belt portion is subjected to an increased tensile loading due to the design of the deflection member, from a comfort position into an emergency position in the direction of the motor vehicle interior.

According to one embodiment of the method, it is provided that, in the secured state of the person when the belt portion is subjected to the increased tensile loading, the belt portion guided over the shoulder and the torso performs a displacement in the direction of the motor vehicle rear and thus counter to the forward direction of travel. Preferably, this rearwardly oriented displacement takes place at the same time as the inward displacement of the belt portion.

According to a further embodiment of the method, in addition to the inward displacement of the belt portion, an upwardly oriented displacement of the belt portion is provided, the upwardly oriented displacement being able to be optionally combined with the rearwardly oriented displacement of the belt portion.

Preferably, it is provided that the displacement of the belt portion from the comfort position into the emergency position is effected automatically and exclusively by the belt portion being subjected to the increased tensile loading. As a result, additional actuators are dispensed with. Naturally, it is conceivable that the belt portion is also guided back automatically from the emergency position into the comfort position.

As already mentioned above, in a preferred embodiment of the method, the increased tensile loading is at least partially affected by a belt tensioner. For example, in this case it is a belt tensioner which is spring-operated or pyrotechnically fired. The belt tensioner is designed, for example, to be reversible.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A motor vehicle comprising:
   a vehicle seat;
   a multipoint safety belt device comprising:
      a belt;
      a belt magazine;
      a belt buckle for releasably securing the belt; and
      a deflection member for guiding the belt emerging from the belt magazine and for deflecting the belt, forming a belt portion of the belt, wherein the belt portion is guided over a shoulder and a chest of a secured motor vehicle occupant seated on the motor vehicle seat, and wherein the deflection member is designed such that, in the state of the motor vehicle occupant secured by the belt, the belt portion when subjected to an increased tensile loading performs a displacement from a comfort position of the belt into an emergency position of the belt in the direction of a motor vehicle interior, wherein the deflection member comprises a through-passage comprising a first portion extending substantially horizontally outwardly and oriented in a direction forward of the vehicle and the second portion having a vertical path and extending inwardly in a rear direction of the vehicle.

2. The motor vehicle as claimed in claim 1, wherein the deflection member is designed such that, in the state of the motor vehicle occupant secured by the belt, the belt portion performs a displacement in the direction of a motor vehicle rear when subjected to the increased tensile loading.

3. The motor vehicle as claimed in claim 1, wherein the displacement of the belt portion is effected automatically and exclusively by the belt portion being subjected to the increased tensile loading.

4. The motor vehicle as claimed in claim 1, wherein the deflection member comprises a contour comprising the first and second portion, said contour comprising a park position and a comfort position and an emergency position for applying the belt portion, wherein when the belt portion is subjected to the increased tensile loading in the applied state, the belt portion is displaced along these portions from the comfort position of the belt in the direction of the emergency position of the belt, wherein in the unapplied state the belt portion is arranged in a park position of the contour.

5. The motor vehicle as claimed in claim 1, wherein the deflection member is designed such that, in the state of the motor vehicle occupant secured by the belt, the belt portion performs an upward displacement when subjected to increased tensile loading.

6. The motor vehicle as claimed in claim 1, wherein the increased tensile loading is effected at least partially by a belt tensioner.

7. The motor vehicle as claimed in claim 1, wherein the multipoint safety belt device comprises a three-point safety belt device.

8. A motor vehicle comprising:
  a vehicle seat;
  a multipoint safety belt device comprising:
    a belt;
    a belt magazine;
    a belt buckle for releasably securing the belt; and
    a deflection member for guiding and deflecting the belt emerging from the belt magazine and forming a shoulder belt portion that when subjected to an increased tensile loading is displaced from a comfort position into an emergency position in a direction of a vehicle interior, wherein the deflection member comprises a through-passage comprising a first portion extending substantially horizontally outwardly and oriented in a direction forward of the vehicle and the second portion having a vertical path and extending inwardly in a rear direction of the vehicle.

9. The motor vehicle as claimed in claim 8, wherein the deflection member is designed such that, in a state of the vehicle occupant secured by the belt, the belt portion performs a displacement in the direction of a vehicle rear when subjected to the increased tensile loading.

10. The motor vehicle as claimed in claim 8, wherein the displacement of the belt portion is effected automatically and exclusively by the belt portion being subjected to the increased tensile loading.

11. The motor vehicle as claimed in claim 8, wherein the deflection member comprises a contour comprising the first and second portion, said contour comprising a park position and a comfort position and an emergency position for applying the belt portion, wherein when the belt portion is subjected to the increased tensile loading in the applied state, the belt portion is displaced along these portions from the comfort position of the belt in the direction of the emergency position of the belt, wherein in the unapplied state the belt portion is arranged in a park position of the contour.

12. The motor vehicle as claimed in claim 8, wherein the deflection member is designed such that, in the state of the vehicle occupant secured by the belt, the belt portion performs an upward displacement when subjected to increased tensile loading.

13. The motor vehicle as claimed in claim 8, wherein the increased tensile loading is effected at least partially by the belt tensioner provided in the belt magazine.

14. The motor vehicle as claimed in claim 8, wherein the multipoint safety belt device comprises a three-point safety belt device.

15. A method for adapting a belt path in a motor vehicle, comprising the steps:
  providing a motor vehicle comprising at least one multipoint safety belt device for a motor vehicle seat, wherein the safety belt device comprises a belt, a belt magazine, a belt buckle for releasably securing the belt and a deflection member;
  guiding and deflecting the belt emerging from the belt magazine and forming a belt portion of the belt guided over a shoulder and a chest of a secured motor vehicle occupant seated on the motor vehicle seat; and
  displacing the belt portion with the deflection member when the belt portion is subjected to an increased tensile loading, from a comfort position into an emergency position in the direction of a motor vehicle interior, wherein the deflection member comprises a through-passage comprising a first portion extending substantially horizontally outwardly and oriented in a direction forward of the vehicle and the second portion having a vertical path and extending inwardly in a rear direction of the vehicle.

16. The method as claimed in claim 15 further comprising the step of performing a displacement in the direction of the motor vehicle rear when in the state of the motor vehicle occupant secured by the belt when the belt portion is subjected to the increased tensile loading, the belt portion.

17. The method as claimed in claim 15, wherein the displacement of the belt portion is effected automatically and exclusively by the belt portion being subjected to the increased tensile loading.

18. The method as claimed in claim 15, wherein the increased tensile loading is effected at least partially by a belt tensioner.

19. The method as claimed in claim 15, wherein the multipoint safety belt device comprises a three-point safety belt device.

* * * * *